Nov. 1, 1966  D. B. PALL  3,282,434
SPRING-MOUNTED FILTER ELEMENT
Filed June 7, 1965  2 Sheets-Sheet 1

United States Patent Office 3,282,434
Patented Nov. 1, 1966

3,282,434
SPRING-MOUNTED FILTER ELEMENT
David B. Pall, Roslyn Estates, N.Y., assignor to Pall Corporation, Glen Cove, N.Y., a corporation of New York
Filed June 7, 1965, Ser. No. 471,490
10 Claims. (Cl. 210—440)

This application is a continuation-in-part of pending application No. 203,803, filed June 20, 1962 and now abandoned and application No. 42,396, filed July 12, 1960, now Patent No. 3,040,894, granted June 26, 1962.

This invention relates to the mounting of filter elements within a housing and, more particularly, to a spring-mounted filter element arranged to resist relative motion of the filter element and the housing caused by shock and vibration.

Under the extreme conditions of acceleration and vibration encountered in the operation of modern aircraft and missiles, the component parts of liquid supply systems and the like must be rigidly and securely mounted to prevent motion of the parts against their supports. If such motion is permitted, the resulting abrasion of mating surfaces develops microscopic solid particles capable of blocking or reducing the flow of liquid at vital points in the system, such as fuel jets, for example. In particular, special consideration must be given to the mounting of removable filter elements so that they are held firmly in position under all conditions of acceleration and shock and over the entire range of vibration frequencies and yet may be easily removed and replaced.

Accordingly, it is an object of this invention to provide a new and improved mount for positioning a filter element in a housing to prevent relative motion of the two under extreme conditions of acceleration and vibration.

A further object of the invention is to provide a mount of the above character arranged to position the filter element accurately within a housing.

Another object of the invention is to provide a filter element mounted in the above manner which is capable of manual removal and replacement.

These and other objects of the invention are attained by providing a spring member having positioning surfaces arranged to engage a first complementary seat formed in one portion of the housing and a second complementary seat formed on the filter element. In its unstressed condition, the spring member is spaced from both seats but compression of the spring member urges the positioning surfaces against the first and second seats to clamp the filter element rigidly and securely in position. In one embodiment of the invention, a third seat in another portion of the housing, spaced from the first seat, receives the opposite end of the filter element, the two portions of the housing being separable, and the spring member is compressed and urges the filter element against this seat when the two portions of the housing are joined.

Further objects and advantages of the invention will be apparent from a reading of the following description in conjunction with the accompanying drawings in which.

Figure 1:
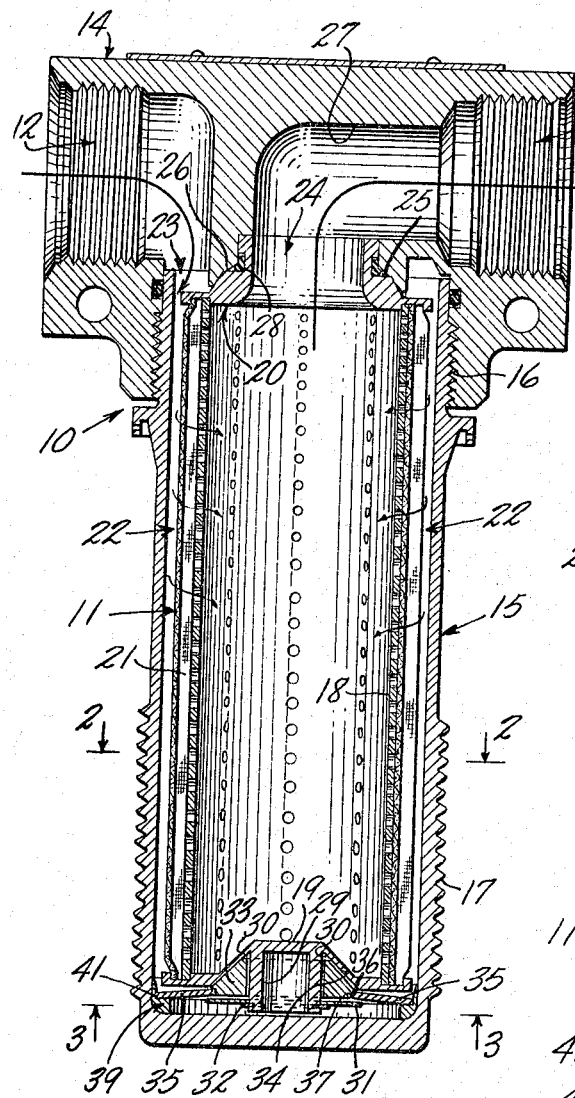
FIGURE 1 is a view in longitudinal section of a typical spring-mounted filter element arranged according to the invention.
Figure 3:
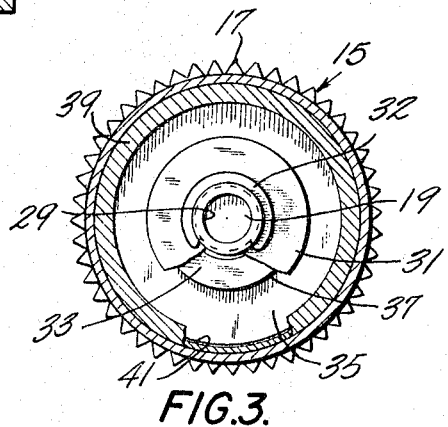
FIGURE 3 is a cross-sectional view showing the spring mounting of the filter illustrated in FIGURE 1, taken on the lines 3—3 and looking in the direction of the arrows.
Figure 2:
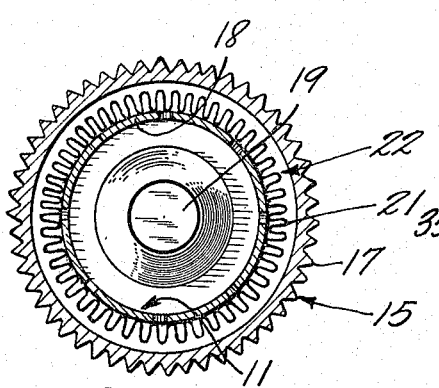
FIGURE 2 is a cross-sectional view of the filter shown in FIGURE 1 taken on the lines 2—2 and looking in the direction of the arrows.

As illustrated in FIGURES 1 and 2, a typical filter unit arranged according to the invention comprises a housing 10 enclosing a cylindrical filter element 11 through which liquid entering an inlet port 12 is guided to reach an outlet port 13. Inasmuch as the invention is particularly useful in mounting filter elements of the replaceable type, the illustrated embodiment shows a separable housing 10 comprised of a filter head 14 and a bowl member 15 joined thereto by screw threads 16, the filter element 11 being positioned within the bowl member 15. In order to facilitate manual joining and separation of these portions of the housing, the bowl member 15 may be provided with a knurled surface 17.

Inasmuch as the filter elements utilized with the invention must be capable of withstanding substantial pressures applied lengthwise of the filtering medium, the filter element 11 is preferably arranged in a unitary structure with a perforated tubular internal support member 18 mounted between two end-pieces 19 and 20 and having a filter medium 21 supported between the end-pieces surrounding the member 18. As best seen in FIGURE 2, the filter medium 21, which should be of the self-supporting type, such as for example rigid wire screening, may be in corrugated form to provide a greater surface area for trapping impurities.

With the filter element 11 positioned inside the bowl member 15 in the manner shown in FIGURE 2, a cylindrical space 22 surrounding the filter element communicates with the inlet port 12 through a passage 23. Through this passage, incoming liquid is directed to the space 22 outside the filter element 11 and is forced inwardly through the filter medium 21 to the interior of the element. In order to conduct the liquid away from the interior of the tubular support 18, the end-piece 20 is provided with a central aperture 24. Surrounding the aperture, a shoulder 25 is formed to cooperate with a complementary-shaped seat 26 in the filter head 14 to position the filter element in the housing, the liquid being carried from the aperture 24 to the outlet port 13 through a channel 27. Seepage of liquid through the junction of the filter element and the head 14 is prevented by a gasket 28 fitted into the shoulder 25 and compressible by axial motion of the filter element toward the seat 26.

At the other end of the filter element the end-piece 19, which has no aperture, acts as a barrier to prevent liquid in the space 22 from entering the central portion of the filter element without passing through the filter medium. In order to provide rigid and secure support for the filter element 11 within the housing and prevent relative motion thereof in accordance with the invention, the outside of the end-piece 19 is provided with a central perpendicular stud 29 and is shaped with an inwardly directed conical surface 30, preferably formed at 45° angle to the axis of the filter element, surrounding the stud 29. At the outer end of the stud, a washer 31 is retained thereon by a snap ring 32, or other suitable retainer, an annular bearing insert 33 being captured between the washer and the surface 30. In order to support the filter element securely in position in the housing 10 while permitting relative rotation of the filter element and the bearing insert, the insert 33 is shaped with a conical surface 34 complementary to the surface 30 so that axial pressure of the bearing insert against this surface positions the end-piece 19 and the filter element 11 in the radial direction.

Figure 4:
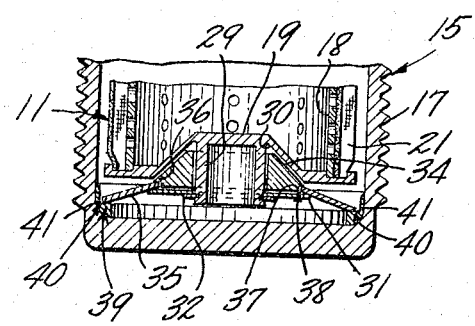
FIGURE 4 is a fragmentary view in section of the filter shown in FIGURE 1 illustrating the relative position of the elements prior to compression of the spring member.

In order to position the filter element securely in this manner, however, the bearing insert 33 must be accurately located with respect to the interior of the housing 10 and a high axial pressure must be exerted against the bearing insert. Accordingly, as best seen in FIGURE 4, an annular conically shaped spring washer 35 retained by the washer 31 against a flange 36 of the bearing insert, has its inside diameter positioned to engage a circumferential seat 37 on the insert 33 and is spaced therefrom by a small radial gap 38 when the washer is not compressed axially. When the filter element 11 is positioned within the bowl member 15, the side of the spring washer 35 away from the filter element rests against a ledge 39 formed in the interior of the bowl member, leaving a small radial gap 40 between the outside edge of the washer and a complementary seat 41 formed on the inside of the bowl member 15. In accordance with the invention, the inside and outside diameters of the spring washer 35 and the diameters of the seats 37 and 41 are controlled so that the deformation of the washer 35 by axial compression closes the gaps 38 and 40 when it is stressed sufficiently to prevent any axial motion of the element 11 with respect to the housing 10 due to vibration or shock, thus securely positioning the filter element in the radial direction.

Assembly of the filter unit is accomplished by inserting the filter element 11 into the bowl member 15, engaging the ledge 39 with the outside rim of the spring washer 35, as shown in FIGURE 4. The bowl member is then screwed onto the filter head 14, driving the shoulder 25 into the seat 26 to compress the gasket 28. At the other end of the filter element, the bowl member is moved toward the end-piece 19, axially compressing the spring washer 35 between the ledge 39 and the flange 36, rotation of the washer and the bearing insert 33 being permitted by sliding of the conical surfaces 30 and 34. When the washer 35 has been deformed by compression sufficiently to engage the seats 37 and 41, positioning the filter element securely in the radial direction, the torque required to turn the bowl member increases sharply so that further rotation is resisted. In this condition, the axial force developed by the washer is great enough to prevent any axial motion of the filter element and the element is accurately and rigidly positioned in the housing. In a typical filter unit arranged according to the invention, an axial pressure of four hundred pounds per square inch developed by the spring washer 35 was found sufficient to prevent any relative motion of the filter element with respect to the housing when subjected to accelerations up to 300 G's and vibration over the entire range of frequencies.

Figure 5:
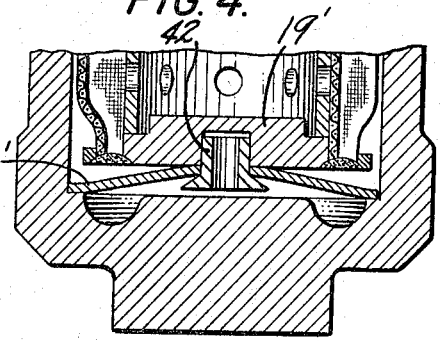
FIGURE 5 is a fragmentary view in section of the lower portion of another embodiment of spring-mounted filter element of the invention.

FIGURE 5 shows another embodiment of the invention. This embodiment, due to its ease of manufacture, will in many instances be a preferred embodiment of the invention. In this embodiment the bearing inserts can be eliminated, and the annular spring directly held to the end piece by a stud or rivet 42.

The spring 35' is connected to the end piece 19' by press-fitting, shrink-fitting, or swaging it into the end piece.

The preferred type of spring 35' as shown is an annular metal spring washer known as a Belleville washer, in the form of a frustrum of a cone. Such a spring washer can be made of any material of high yield strength and high hardness, such as steel, stainless steel, and nickel chromium alloys. Certain synthetic resins, such as polytetrafluoroethylene and polyoxymethylene can also be used. The spring can be of uniform thickness throughout, or can vary in thickness, thinner at the center than at the edge, to give improved flexing and sealing. The configuration of the spring is not critical, but it should be in the form generally of an annular bowed spring disk.

The spring is mounted so as to turn freely on the rivet when not under stress. When under stress, the outer periphery of the spring washer 35' is dimensioned to engage the bottom and side of the filter bowl. When axial pressure is applied, due to the sealing of the bowl and head portions, the spring is flattened. At the same time, the inside periphery of the spring is thrust into tight engagement of the rivet. The outer periphery of the spring thus tightly engages the wall and bottom of the filter bowl, and prevents any sidewise or rotational movement within the filter unit after assembly. In addition, the spring holds the filter element in a leak-proof seal against the supporting means in the head. Thus, when assembled, the filter is firmly positioned and held against all relative movement within the filter bowl.

Figure 6:
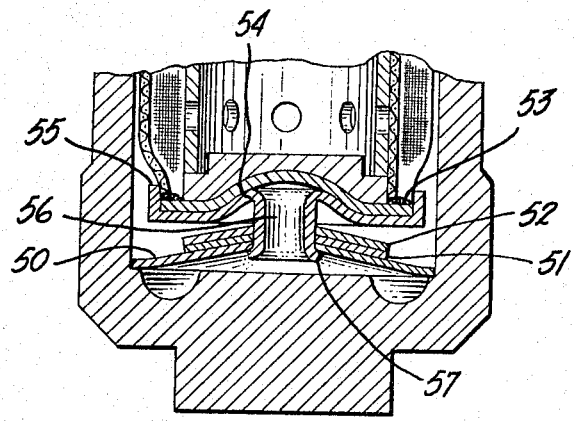
FIGURE 6 is a fragmentary view in section of the lower portion of another embodiment of the spring-mounted filter element of the invention.

FIGURE 6 illustrates another embodiment of the invention. The filter element of FIGURE 6 is provided with a bottom end cap 53 to which is attached a centrally-domed end piece 54. The outer flange 55 of the end piece can be attached to the end piece 54 by braising welding, soldering or the like. The end piece 54 has extending therefrom, a centrally located tubular portion 56. This centrally located tubular portion terminates in a flared end 57. The end piece tubular portion and flared end serve the function of the rivet of the embodiment shown in FIGURE. 5.

Resting upon an annular spring disk 50 are two secondary annular spring disks 51 and 52. The three spring disks 50, 51 and 52 are retained on the tubular portion by the flared end 57 and are of the same cone angle as the primary disk 50. The primary annular disk 50 engages the side and bottom of the filter bowl. The function of the secondary annular spring disks 51 and 52 is to increase the force required to flatten the primary spring 50, and thus increase the sealing force exerted by that spring. These annular spring disks may be made of the same materials described above for the spring disk 35'.

In the free position, before assembly, the spring disk 50 is free to rotate on the central tubular portion 56 above the flange 57. When the filter bowl is attached to the head, the flange 57 is forced against secondary spring disks 51 and 52, thereby forcing disk 50 to flatten. The inner periphery of the annular spring disk 50 is thrust into tight engagement with the central tubular portion 56 of the flange 57. At the same time, the outer periphery of the spring disk 50 is forced into tight engagement with the side and bottom of the filter bowl. The filter element, due to the force exerted by spring disk 50, simultaneously forms a leak-proof seal with the support means in the head. Thus, the filter element is firmly positioned, and prevented from having any movement relative to the filter bowl.

It should be noted that the flange 57 of the embodiment shown in FIGURE 6, if desired, can be substituted for the rivet 42 of the embodiment shown in FIGURE 5.

Although the invention has been described herein with reference to certain specific embodiments, many modifications and variations will occur to those skilled in the art. Accordingly, the invention is not intended to be limited in scope except as defined by the following claims.

Having regard to the foregoing disclosure, the following is claimed as the inventive and patentable embodiments thereof:

1. A filter unit comprising a cylindrical filter element, a filter housing enclosing the filter element to direct flow fluid therethrough having a head portion and a bowl portion, an inlet and an outlet in said head portion, first seat means in the head of the housing receiving one end of the filter element, said one end of the filter element being in communication with the outlet, second seat means in the bottom of the bowl portion of the housing, stud means mounted at the bottom of the filter element, retaining means attached at the lower end of the stud means, bearing means rotatably mounted on the stud means above the retaining means, said bearing means having a conical surface, the bottom of the filter element being formed with a conical surface to engage the conical surface on the bearing, and spring disk washer means positioned between the bottom of the filter element and the bottom of the bowl portion, urging the filter element toward the first seat means and deformable thereby, to engage and hold the filter element firmly in position within the housing.

2. A filter unit according to claim 1 wherein the conical surface on the bearing means is formed at an angle of approximately 45° to the axis of the filter element.

3. A filter unit in accordance with claim 1 wherein the spring disk washer is a Belleville washer.

4. A filter unit comprising, in combination, a filter housing having a head portion and a bowl portion removably mounted thereon; an inlet and an outlet in the housing; a filter element having upper and lower end caps disposed in the housing; first seat means receiving and supporting the filter element in the head portion, in a manner to direct all fluid from the inlet to the upstream side of the filter element and to direct all fluid from the discharge side of the filter element to the outlet of the housing, thereby ensuring that all liquid entering the housing passes through the filter; an extended second seat means having a side surface and a wider end portion fixed to the center of the lower end cap; a third seat means in the bowl portion; an annular, bowed spring disk rotatably retained to the lower end cap of the filter element by said wider end portion, and engaged to said wider end portion so as to be removable from the housing with the filter element, the spring disk having an inner and an outer periphery, the inner periphery loosely contacting the side surface of the second seat means and the outer periphery being adapted to engage the third seat means in the bowl portion of the housing, and the spring disk being dimensioned such that upon compression thereof when the bowl portion is mounted on the head portion, the disk is compressed and partially flattened between the third seat means in the filter bowl portion and the lower end cap of the filter element, so that the inner periphery of the annular spring disk tightly engages the side surface of the second seat means and the lower end cap of the filter element and the outer periphery tightly engages the third seat means in the housing, thereby positioning, supporting and firmly biasing the filter element against all radial, axial and rotational movement within the housing.

5. A filter unit in accordance with claim 4 wherein the annular spring disk is attached to the lower end cap of the filter element by a stud having a flanged end portion.

6. A filter unit in accordance with claim 4 wherein the bowl portion is threadedly attached to the head portion of the housing.

7. A filter unit in accordance with claim 4 in which the bowed spring disk is frustoconical.

8. A filter unit in accordance with claim 4 wherein the bowed spring disk is a Bellevelle washer.

9. A filter unit in accordance with claim 4 wherein the second seat means comprises a cap having a central tubular portion extending outwardly therefrom, and having a flared end portion constituting the wider end portion.

10. A filter unit in accordance with claim 4 wherein a plurality of spring disks are mounted on the second seat means.

References Cited by the Examiner
UNITED STATES PATENTS

| | | | |
|---|---|---|---|
| 1,940,316 | 12/1933 | McKinley | 210—433 X |
| 2,389,814 | 11/1945 | Pond et al. | 210—130 X |
| 2,431,782 | 12/1947 | Walton et al | 210—234 X |
| 3,034,656 | 5/1962 | Kasten | 210—492 |
| 3,036,711 | 5/1962 | Wilhelm | 210—130 |
| 3,045,826 | 7/1962 | Howard et al. | 210—443 X |
| 3,093,581 | 6/1963 | Pall et al. | 210—444 |

REUBEN FRIEDMAN, *Primary Examiner.*

J. DE CESARE, *Assistant Examiner.*